(12) United States Patent
Chen et al.

(10) Patent No.: US 8,145,008 B2
(45) Date of Patent: Mar. 27, 2012

(54) NON-UNIFORM IMAGE DEFECT INSPECTION METHOD

(75) Inventors: Liang-Chia Chen, Zhonghe (TW); Chia-Cheng Kuo, Taipei County (TW)

(73) Assignee: National Taipei University of Technology, Taipei (TW)

( * ) Notice: Subject to any disclaimer, the term of this patent is extended or adjusted under 35 U.S.C. 154(b) by 1082 days.

(21) Appl. No.: 11/933,511

(22) Filed: Nov. 1, 2007

(65) Prior Publication Data

US 2008/0107328 A1 May 8, 2008

(30) Foreign Application Priority Data

Nov. 3, 2006 (TW) .............................. 95140656 A

(51) Int. Cl.
*G06K 9/40* (2006.01)
*G06K 9/00* (2006.01)
*G06K 9/36* (2006.01)

(52) U.S. Cl. .................. 382/275; 382/149; 382/250

(58) Field of Classification Search .................. 382/103, 382/115, 118, 149, 173, 190, 218, 250, 275
See application file for complete search history.

(56) References Cited

U.S. PATENT DOCUMENTS

| | | | |
|---|---|---|---|
| 5,172,000 A | 12/1992 | Scheff et al. | |
| 5,506,676 A | 4/1996 | Hendler et al. | |
| 5,719,958 A | 2/1998 | Wober et al. | |
| 6,442,234 B1 | 8/2002 | Morken et al. | |
| 7,315,631 B1* | 1/2008 | Corcoran et al. | 382/118 |
| 7,620,218 B2* | 11/2009 | Steinberg et al. | 382/118 |
| 2002/0081033 A1* | 6/2002 | Stentiford | 382/218 |
| 2006/0186361 A1 | 8/2006 | Weiss et al. | |
| 2007/0070339 A1 | 3/2007 | Hamamatsu et al. | |
| 2007/0230819 A1 | 10/2007 | Shimizu et al. | |

OTHER PUBLICATIONS

Teramoto, A., T. Murakoshi, M. Tsuzaka, and H. Fujita. 2005. Development of an Automated X-ray Inspection Method for Microsolder Bumps, International Symposium on Electronics Materials and Packaging, pp. 21-26.

* cited by examiner

*Primary Examiner* — Yon Couso
(74) *Attorney, Agent, or Firm* — WPAT, P.C.; Justin King

(57) ABSTRACT

A non-uniform image defect inspection method includes steps of inputting an original two-dimensional image; separating a non-uniform background image from the original two-dimensional image by Discrete Cosine Transform (DCT) to obtain a residual image without the non-uniform background image; binarization segmenting the residual image to extract defects from the residual image, wherein the segmented defects are the inspection results.

6 Claims, 11 Drawing Sheets

A

B

C

D

A	B	C

D	E	F

G	H	I

J   K   L

M   N   O

A

B

C

D

E

F

G

H

I

NON-UNIFORM IMAGE DEFECT INSPECTION METHOD

FIELD OF THE INVENTION

The invention relates to a non-uniform image defect inspection method, especially to a non-uniform image defect inspection method that can extract non-uniform image defects from the inspected image by way of reconstructing an original background image without defects by Discrete Cosine Transform (DCT) and selecting an appropriate threshold.

DESCRIPTION OF THE RELATED ART

Display apparatuses are main interfaces for message delivery and communication. Flat panel displays become more popular because they are light, thin and portable, and they consume low energy. Flat panel displays have been developed to many types such as PDP (Plasma Display Panel), LED (Light Emitting Diode), OLED (Organic Light Emitting Diode) and LCD (Liquid Crystal Display) from CRT (Cathode Ray Tube) which occupies a large space, wherein TFT (Thin Film Transistor) LCD technology is most matured. In recent years, TFT LCD has become a mainstream of displays and been widely used. The amount of LCD increases fast, and large screen LCD becomes a tendency. With the development of LCD technology, the requirement for quality has become highly demanding.

However, for product defect inspection, an eyes-inspection method is still mainly used in most of manufacturers. Even following the same inspection standard, different workers may have their own standards by using eyes-inspection method, and the same qualities of the inspected LCD products certainly cannot be reached. In addition, eyes-inspection needs a lot of workers, so labor cost will be increased and the competitiveness of the manufacturers may be reduced. Therefore, how to improve product yield quickly and precisely is the key to industrial competition.

Defects of a flat panel display may be divided to macro-defect and micro defect. A macro-defect is a defect larger than 100 mm and can be detected by human eyes. Some serious macro defects can be easily detected. A micro defect is a defect smaller than 100 mm and it cannot be easily detected by human eyes and CCD (Charge-coupled device) cameras. Thus, some zooming optical apparatuses are utilized to detect micro-defects. Macro defects include three types, namely Mura, Simi, and Zure. Mura denotes that the brightness of the flat panel display is not uniform. Simi denotes that the flat panel display has stains and splashes. Zure denotes that liquid crystal molecules are not rightly arranged or fail to be arranged in line. If the defects are large enough, they can be easily detected with human eyes or CCD cameras.

Mura defects are generated when the brightness of the flat panel display is not uniform. Mura defects are generated because of the following reasons: the thickness of the TFT is not uniform, the liquid crystal is not uniform, the gap forms between two glass substrate, the color filter is not uniform, and the light from the backlight module is not uniform. Mura defects are variable and can be formed by different factors that may exist in each production process. Mura defects often are not uniform and have a low contrast. So Mura defects have tiny brightness difference with their surrounding background and have non-uniform brightness changes. It is difficult to inspect Mura defects because Mura defects have the low contrast and un-uniform brightness changes, and images displayed on LCD have un-uniform brightness variation. If Mura defects are inspected with human eyes, it may be very time-consuming and cannot always maintain a constant quality standard.

It is difficult to inspect Mura defects because of non-uniform brightness distribution of an LCD image. The non-uniform brightness distribution can be realized by directly observing an LCD image with human eyes no matter from horizontal direction or vertical direction. It is difficult to inspect the defects even by extracting the defects through image binarization.

The relating methods for image defect inspection have been disclosed as follows.

(1) US 20060186361 "Method and apparatus for high-throughput inspection of large flat patterned media using dynamically programmable optical spatial filtering": A programmable optical Fourier filtering in the focal plane of a telecentric lens system is used to identify non-periodic defects in an inspection system for planar objects having periodic structures. An optical Fourier filter can be reconfigurable and is having a contrast ratio sufficient to suppress periodic components of a transformed image.

(2) US 20070070339 "Inspection method and inspection apparatus": The inspection apparatus applies a spatial filter to process a printed Fourier transformed image of a circuit pattern of the inspection object. The spatial filter can be provided in the form of a Fourier transformed image.

(3) US 20070230819 "Method and apparatuses for image inspection": This method is used to determine the difference in intensity information between the reference image and the Fourier transformed image of the identified image.

(4) U.S. Pat. No. 5,172,000 "Spatial filter for optically based defect inspection system": The imaging system is used to detect defects in a specimen having a repetitive pattern. A spatial filter receives a spatial frequency spectrum produced by a Fourier transform lens and blocks preselected spatial frequency components.

(5) U.S. Pat. No. 5,506,676 "Defect detection using Fourier optics and a spatial separator for simultaneous optical computing of separated Fourier transform components": This method applies the Fourier transform components of an ideal pattern to be compared with the ones of a measured pattern. The differences in relative intensities of the spatial components indicate a defect.

(6) U.S. Pat. No. 5,719,958 "System and method for image edge detection using discrete cosine transforms": An electronic image processing system for edge detection applies a DCT/IDCT processor to transform the converted signal according to the predetermined basis matrices stored in a basis matrix memory.

Besides eyes-inspection method, there are also many other methods for the conventional image inspection, such as space-domain analysis method and frequency-domain analysis method. In the space-domain analysis method, defects are inspected by image matching or searching with various restrictions. It is easy to detect defects with clear edges by using the space-domain analysis method; however, it is difficult to detect defects with unclear edges such as Mura defects by using the space-domain analysis method. In the frequency-domain analysis method, it applies discrete Fourier transform (DFT) to perform a frequency domain transformation. DFT is always performed with complex number and complex calculation, and it needs a sample image without any defect as an inspection standard, which will reduce the inspection speed.

Except for flat panel display production, non-uniform brightness defects inspection is also needed in other industries. In semiconductor packaging, each pin of a printed circuit board (PCB) must be precisely bonded, and a PCB is easy to broken if any pin is not correctly bonded. It makes ball grid array (BGA) package or bump package being preferred by most of manufacturers. However, the height of each ball or pump in a same board should be kept within an acceptable range, as well as the coplanarity of the ball array or the bumps should be kept within an acceptable range. A ball or a bump whose height is lower than others may cause open circuit on the PCB. Alternatively, a ball or a bump whose height is higher than others may cause short circuit on the PCB.

Although the coplanarity of a ball grid array or bumps on a single-layer PCB can be inspected by laser scanning, most PCBs are inspected after they are packaged to be as the multilayer PCBs. X-ray tomography is applied to detect the internal structure of a multilayer PCB. High-energy and short-wave X-ray can pass through a packaged PCB and an X-ray detector can judge whether the brightness of the X-ray image is uniform (Teramoto, A., T. Murakoshi, M. Tsuzaka, and H. Fujita. 2005. Development of an Automated X-ray Inspection Method for Microsolder Bumps, International Symposium on Electronics Materials and Packaging, pp. 21-26; U.S. Pat. No. 6,442,234 "X-ray inspection of ball contacts and internal vias").

After being irradiated by X-ray, the irregular balls or bumps on the PCB will generate bright points or dark points on the irradiation image. According to the bright points and the dark points, the position of the balls or bumps with irregular coplanarity can be found out. After being irradiated by X-ray, normal balls and bumps will generate regular gray changes on an irradiation image, and the irradiation image is called background image. After being irradiated by X-ray, the irregular balls or bumps on the PCB will generate bright points or dark points having different brightness with the background image. Since the image difference could be undiscoverable and the brightness of the background image could be non-uniform, it is also difficult to inspect defects on a PCB with X-ray tomography.

BRIEF SUMMARY

One object of the invention is to provide a non-uniform image defect inspection method, which replaces eyes-inspection with an inspection calculation based on image reconstruction to enhance the inspection efficiency.

Another object of the invention is to provide a non-uniform image defect inspection method, which can inspect different types of defects without any defect image template and can enhance the inspection speed.

To achieve the above objects, the non-uniform image defect inspection method of the invention detects the background information by performing DCT and IDCT operations to reconstruct an original background image without defects, and then extracts the defects from the inspected image to detect non-uniform image defects with an appropriate threshold according to that the background image without defects is different to the original image with defects.

The non-uniform image defect inspection method of the invention includes the following steps:
   step 1, inputting an original two-dimensional image;
   step 2, separating a non-uniform background image from the original two-dimensional image by Discrete Cosine Transform (DCT) to obtain a residual image without the non-uniform background image;
   step 3, binarization segmenting the residual image to segment defects from the non-uniform background image, wherein the segmented defects are the inspection results.

The non-uniform image defect inspection method of the invention further includes a step of quantifying the binarization segmented defect regions, which is described as step 4:
   Step 4, performing quantified value analysis on the binarization segmented defect regions and setting a quantifying threshold, wherein regions with a corresponding quantified value less than the quantifying threshold are regarded as acceptable regions and eliminated, and the residual defect regions are the inspection results.
Wherein step 2 further includes the following steps:
   step 2.1, performing a 2D DCT operation on the original two-dimensional image to obtain DCT coefficients of a frequency domain;
   step 2.2, selecting a cut-off frequency from the frequency domain and eliminating high-frequency DCT coefficients higher than the cut-off frequency;
   step 2.3, performing a 2D Inverse DCT (IDCT) operation to reconstruct a background image with a brightness distribution similar to the brightness distribution of the original two-dimensional image;
   step 2.4, subtracting the background image from the original two-dimensional image to remove the background with non-uniform brightness distribution and obtaining the residual image.
In step 2.2, the cut-off frequency is a frequency of the DCT coefficients on finishing a first order attenuation, wherein the DCT coefficients less than the cut-off frequency is remained, and the DCT coefficients higher then the cut-off frequency is eliminated through being set as 0.

According to a preferred embodiment, the image binarization in step 3 is a maximum entropy method. An optimal threshold is obtained by the maximum entropy method. A region with a corresponding quantified value larger than the optimal threshold is taken as the defect, and a region with a corresponding quantified value less than the optimal threshold is taken as the background. Then a gray value of the defect is set to 255 and a gray value of the background is set to 0. However, the image binarization is not limited to the maximum entropy method, and any other binarization operation can be used as the image binarization.

According to another preferred embodiment, in step 4, the quantified value analysis adopts a Mura defect quantification standard released by the semiconductor equipment and materials international (SEMI) in 2002, and uses a SEMU value to take as a Mura defect of a severity order. However, the quantified value analysis is not limited to using the SEMU value, and any other quantification method capable of quantifying defects can be used.

BRIEF DESCRIPTION OF THE DRAWINGS

These and other features and advantages of the various embodiments disclosed herein will be better understood with respect to the following description and drawings, in which like numbers refer to like parts throughout.

DETAILED DESCRIPTION

Figure 1:
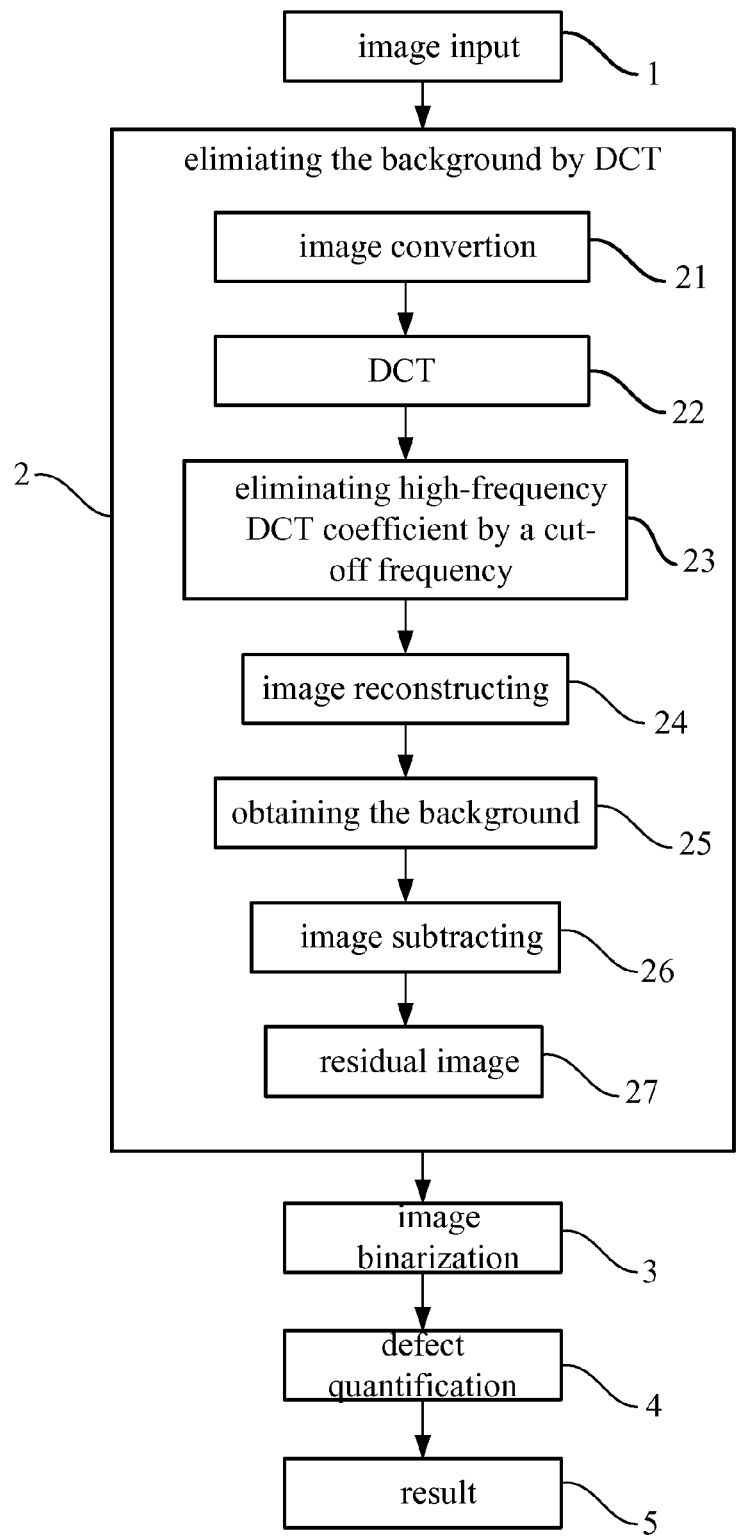
FIG. 1 is a flow chart of the non-uniform image defect inspection method according to the invention.

FIG. 1 is a flow chart of the non-uniform image defect inspection method according to the invention. In step 1, an original two-dimensional (2D) image is inputted. In step 2, the background of the original two-dimensional image is eliminated by discrete cosine transform (DCT). Step 2 further includes the following steps: in step 21, converting the original two-dimensional image by performing a 2D DCT operation; in step 22, obtaining DCT coefficients of a frequency domain; in step 23, selecting a cut-off frequency from the frequency domain and eliminating the high-frequency DCT coefficients according to the cut-off frequency; in step 24, performing a 2D IDCT operation to revert the original 2D image; in step 25, reconstructing a background image, wherein a brightness distribution of the background image is similar to that of the original 2D image; in step 26, subtracting the background image from the original 2D image to eliminate regions of non-uniform brightness distribution; in step 27, obtaining a residual image. In step 3, the defect image regions are binary segmented from the residual image. In step 4 for quantifying the defects, performing quantified value analysis on the binarization segmented defect regions and setting a quantifying threshold, wherein regions with a corresponding quantified value less than the quantifying threshold are regarded as acceptable regions and eliminated, and the residual defect regions are the inspection results. In step 5 of inspection results, the residual defect regions are the inspection results.

Embodiment 1—Eliminating the Non-Uniform Background of the Original 2D Image

In the invention, the input image is converted from space domain to frequency domain by a 2D DCT which is defined as the formula 1:

$$C(u, v) = \alpha_1(u)\alpha_2(v)\sum_{x=0}^{M-1}\sum_{y=0}^{N-1} f(x, y)\cos\left[\frac{\pi(2x+1)u}{2M}\right]\cos\left[\frac{\pi(2y+1)v}{2N}\right] \quad (1)$$

Wherein the original image is denoted as M×N which can be adjusted according to a demanded resolution of the inspector;

f(x,y) denotes the input information;

C(u,v) denotes the output DCT coefficients;

$x = 0, 1, 2, \ldots, M-1;$ $y = 0, 1, 2, \ldots, N-1;$ $u = 0, 1, 2, \ldots, M-1;$ $v = 0, 1, 2, \ldots, N-1;$ $$\alpha_1(u) = \begin{cases} \sqrt{\frac{1}{M}} & \text{for } u = 0 \\ \sqrt{\frac{2}{M}} & \text{for } u \neq 0. \end{cases}$$

$$\alpha_2(v) = \begin{cases} \sqrt{\frac{1}{N}} & \text{for } v = 0 \\ \sqrt{\frac{2}{N}} & \text{for } v \neq 0. \end{cases}$$

Figure 2:
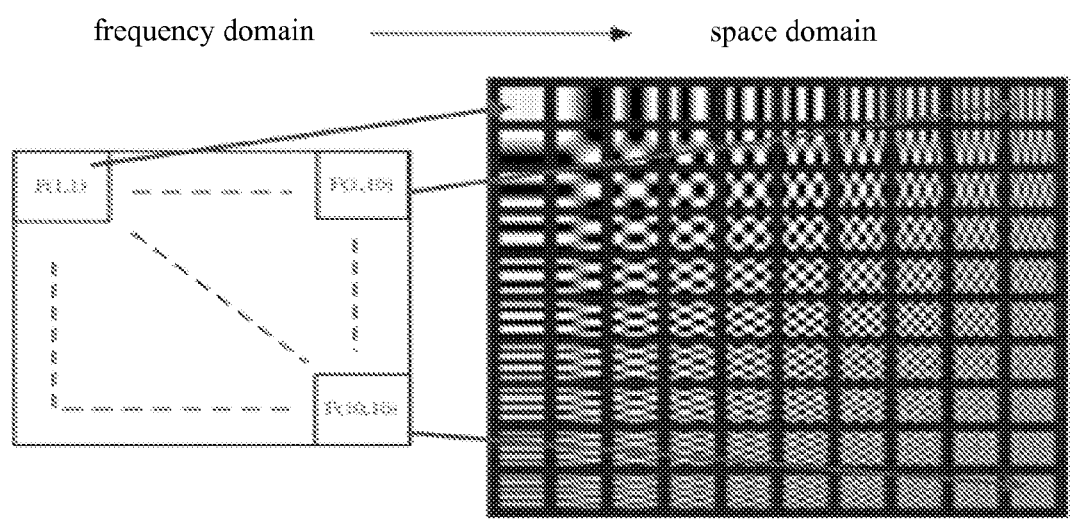
FIG. 2 shows a fundamental image processed by DCT in frequency domain and in space domain.
Figure 3:
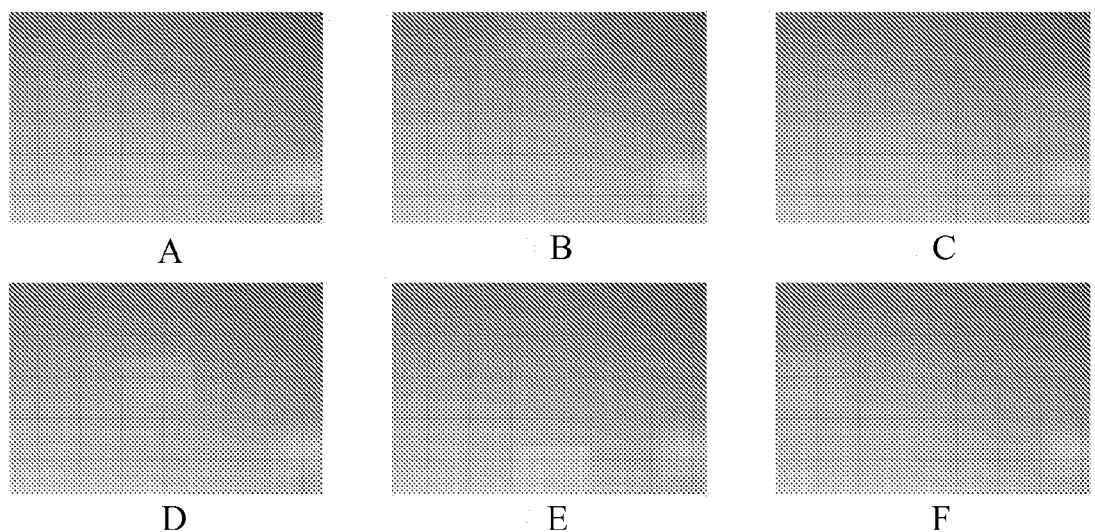
FIG. 3 shows an eyes-inspection example of inspecting defects with different positions and the same background of an image.

The 2D DCT describes an original image with a plurality of 2D fundamental image arrays. A 2D fundamental image array is a product of a vertical fundamental array and a horizontal fundamental array, as shown in formula 2. With different u or different v, a fundamental array image has different brightness. The bigger u or v is, the higher the changing frequency of a fundamental array image is. Therefore, the frequency distribution from low frequency to high frequency is from the upper left to the lower right of DCT distribution. FIG. 2 shows a fundamental image array of a 10×10 image array in frequency domain.

$$f(x, y) = \sum_{u=0}^{M-1} \alpha_1(u)\cos\left[\frac{\pi(2x+1)u}{2M}\right]\sum_{v=0}^{N-1} \alpha_2(v)C(u, v)\cos\left[\frac{\pi(2y+1)v}{2N}\right] \quad (2)$$

The part of information with low frequencies in frequency domain carries most of information of an image. Hence, an appropriate cut-off frequency is to be selected as a threshold. Information with frequencies higher than the cut-off frequency will be removed and information with frequencies lower than the cut-off frequency will be remained as background information. A background image can be reconstructed through performing a 2D IDCT on the remained information with low frequencies.

Figure 4:
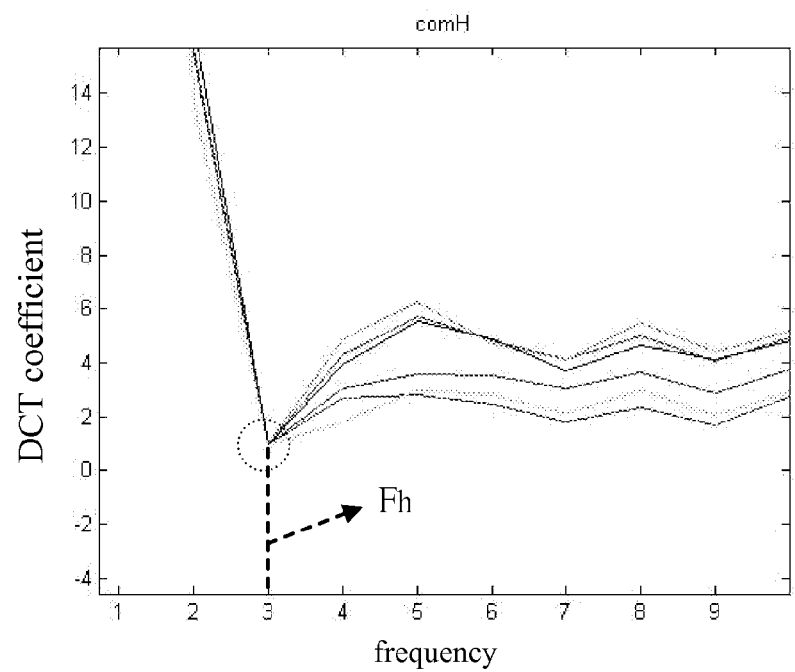
FIG. 4 is a DCT coefficients distribution chart in horizontal direction (4A) and vertical direction (4B).
Figure 4:
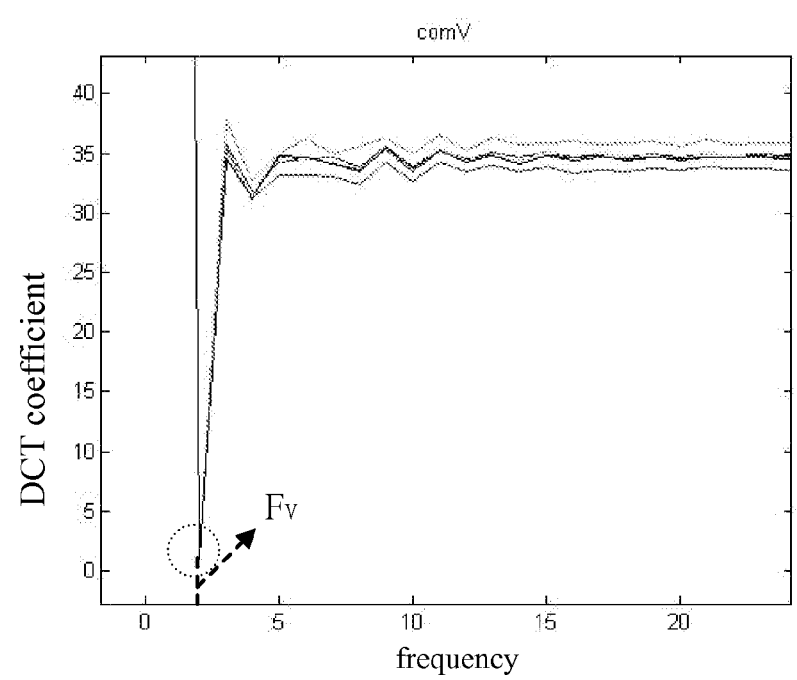

To obtain an appropriate cut-off frequency, the inventors add some manual defects on different positions to an image with Mura defects (shown in FIG. 3A) to generate a group of images having the same background with different defect positions (as shown in FIG. 3B to FIG. 3F). Then a DCT operation can be performed on these images, and the distribution of the vertical DCT coefficients and the horizontal DCT can be drawn as FIG. 4. FIG. 4 shows the distribution of DCT coefficients. It can be seen from FIG. 4 that the frequencies are the same in the images with the same background before the end of the first step attenuation. Therefore, the frequency when the first step attenuation is ending is chosen as the cut-off frequency. $F_h$ and $F_v$ denote a horizontal cut-off frequency and a vertical cut-off frequency respectively. As described as formula 3, DCT coefficients with frequencies lower than $F_h$ or $F_v$ will be remained and DCT coefficients with frequencies higher than $F_h$ and $F_v$ will be set to zero. Then the remained DCT coefficients are performed on a 2D IDCT operation to precisely reconstruct a background image. 2D IDCT is defined as formula 4.

$$C_B(u, v) = \begin{cases} C_{hv}(u, v), & u \leq F_v \text{ or } v \geq F_h \\ 0, & \text{otherwise} \end{cases} \quad (3)$$

Wherein $C_{hv}$ (u, v) denotes a DCT coefficient remaining horizontal and vertical energy;

$C_B$ (u, v) denotes a DCT coefficient of a background image;

$F_V$ and $F_h$ are shown in FIG. 4.

$$f_B(x, y) = \sum_{u=0}^{M-1} \sum_{v=0}^{N-1} \alpha_1(u)\alpha_2(v)C_B(u, v)\cos\left[\frac{\pi(2x+1)u}{2M}\right]\cos\left[\frac{\pi(2y+1)v}{2N}\right] \quad (4)$$

$f_B$ (x, y) denotes a background image formed by performing a 2D DCT.

The remained DCT coefficients are performed on a 2D IDCT operation to reconstruct a background image. The brightness of the background image has a similar distribution with that of the original 2D image. Then, subtracting the background image from the original 2D image to obtain a residual image.

Embodiment 2—Image Binarization

After reconstruction by DCT, the residual image is performed using an image binarization. In this embodiment, the image binarization is a maximum entropy method. The maximum entropy method is applied to obtain an optimal threshold that is utilized to segment defects from the background image. The image regions whose brightness is higher than the optimal threshold are defined as defect regions, and the image regions whose brightness is lower than the optimal threshold are defined as background regions. Then a gray value of the defect is set to 255, and a gray value of the background is set to 0. In addition, any other binarization operation can be used as the image binarization.

According to the second law of thermodynamics, when a system is on a uniform disorder state, the entropy of the system is the maximum. As a function, the entropy is utilized to denote the disorder grade of a system. If the incident probability is average distributed, the entropy is a negative number. The maximum entropy method can find out the maximum entropy between the background and the object, which denotes that the distribution of the background and the object is ideally uniform. Let the gray scale of an image to be 0 to 255 and let T to denote a threshold, the incident probabilities of the object and the background are respectively defines as formula 5 and formula 6.

$$P(O) = \sum_{i=0}^{T} p_i \quad (5)$$

$$P(B) = 1 - P(O) \quad (6)$$

Wherein $P_i$ denotes the probability that gray i exits in the image, i=0,1,2, . . . , 255. Formula 7 and formula 8 denote the object entropy E(O) and the background entropy respectively. Formula 9 denotes the whole image entropy. When E (T) reaches the maximum, the gray distribution of the object region and the background region are most uniform, wherein T denotes a threshold to segment the two kinds of regions.

$$E(O) = -\sum_{i=0}^{T} \frac{p_i}{P(O)} \ln\left(\frac{p_i}{P(O)}\right) \quad (7)$$

$$E(B) = -\sum_{i=T+1}^{255} \frac{p_i}{P(B)} \ln\left(\frac{p_i}{P(B)}\right) \quad (8)$$

$$E(T) = E(O) + E(B) \quad (9)$$

Image binarization may generate some irregular portions at the edges of the defect regions. After image binarization, the image processing method, such as filtering, dilation, erosion, opening or closing, can be used to obtain smoother edges.

Embodiment 3—Image Segmentation

Figure 5:
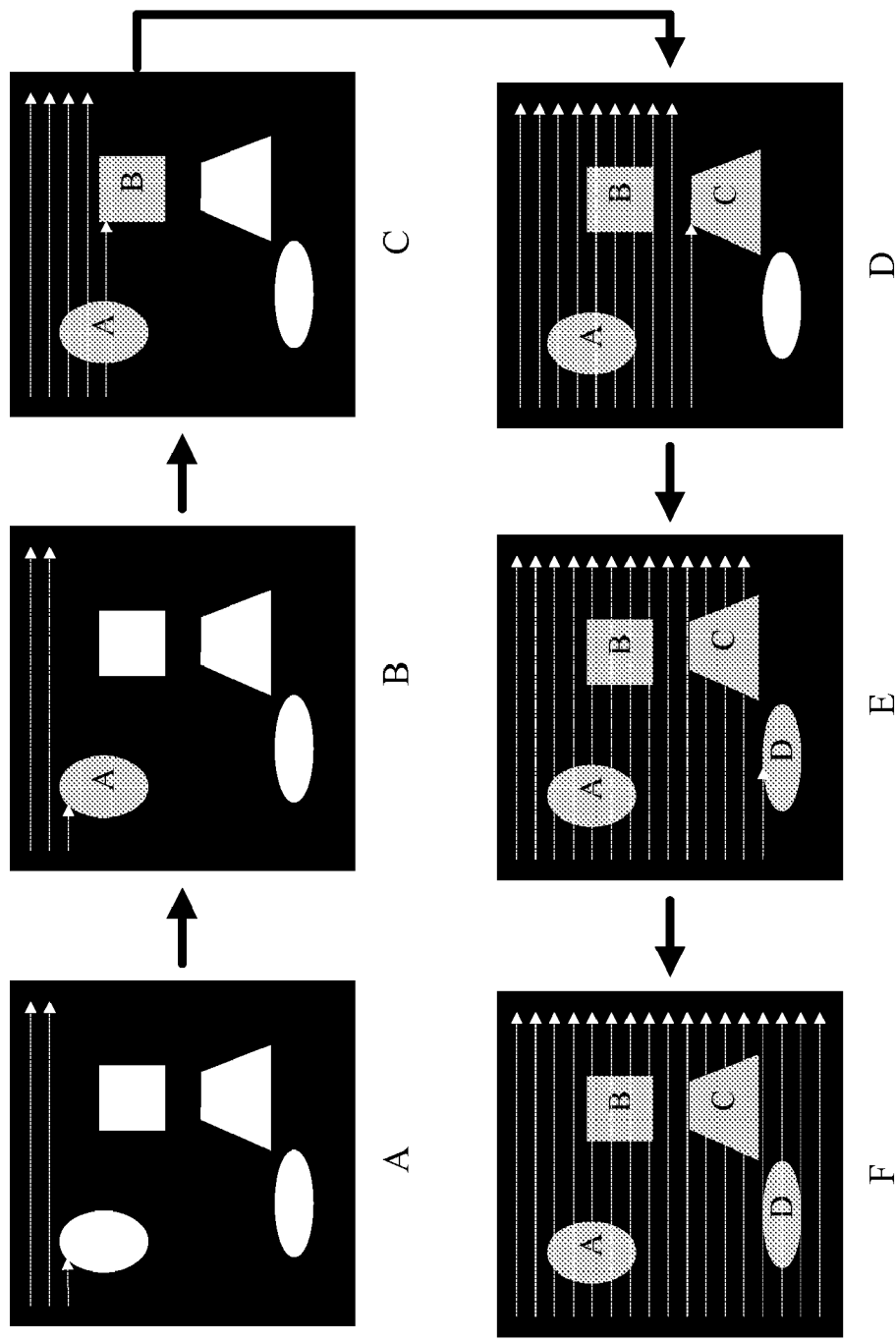
FIG. 5 shows the image segmentation labels

The image performed an image binarization may include some non-uniform regions. To segment each individual non-uniform image defect region, an image segmentation is performed and each individual non-uniform image defect region is labeled with a unique codeword. In this embodiment, each pixel is regarded as a seed, and image segmentation is performed by searching pixel to pixel from the original pixel on the left corner, by way of that from left to right and from top to bottom. FIG. 5 shows the procedure of the image segmentation. Assuming that the gray value of the dark points in the binarization image is 0, and the gray value of the bright points (defects) is 255. The procedure is started by searching for a first bright point which is regarded as a seed (shown in FIG. 5A). Then, label the seed with a codeword A, and perform a region growing operation based on four neighbors or eight neighbors to search pixels that are bright points and connected with the seed. As shown in FIG. 5B, the procedure results in a close region labeled A after the region growing operation. Then, search for a next unlabeled bright point from left to right and from top to bottom, regard it as a seed to perform a region growing operation, and label it with B, as shown in FIG. 5C. By repeating the above-mentioned searching process for unlabeled bright points until the last pixel, all the close regions of the image can be segmented, as shown in FIG. 5F.

Embodiment 4—Quantifying the Size of Each Defect Region and Eliminating Acceptable Regions The position and shape of each defect region are obtained by image binarization and image segmentation. In this embodiment, a quantified value analysis of defects will be applied to defect quantify each segmented region to analyze a severity order of the inspected defect. By comparing the defects with a predetermined defect judgment standard, the embodiment can determine whether a defect is an acceptable defect.

Figure 6:
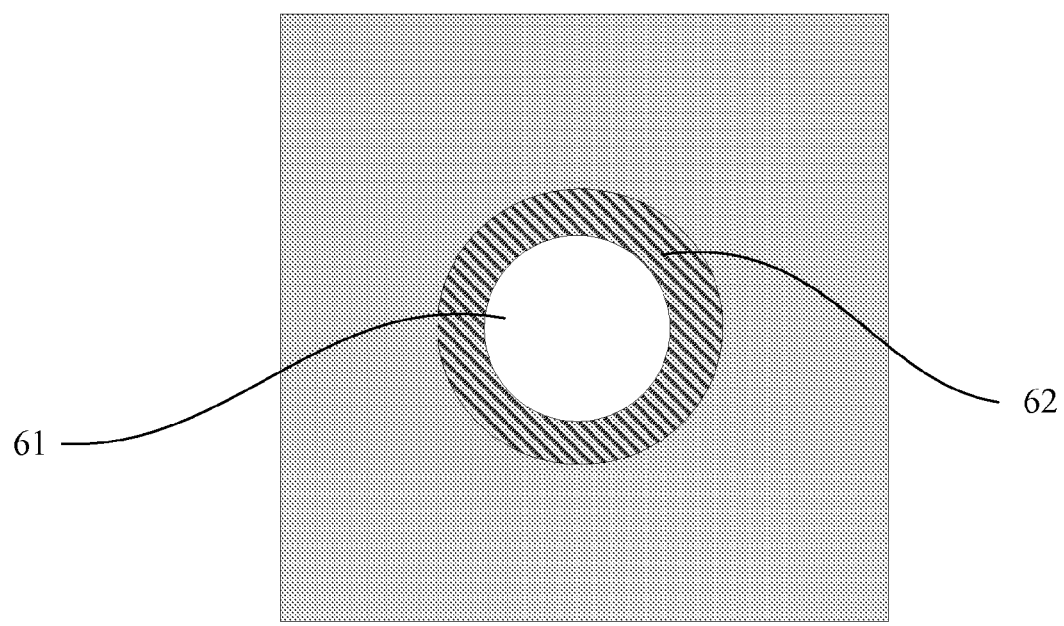
FIG. 6 shows the defects and background of an image.
Figure 7:
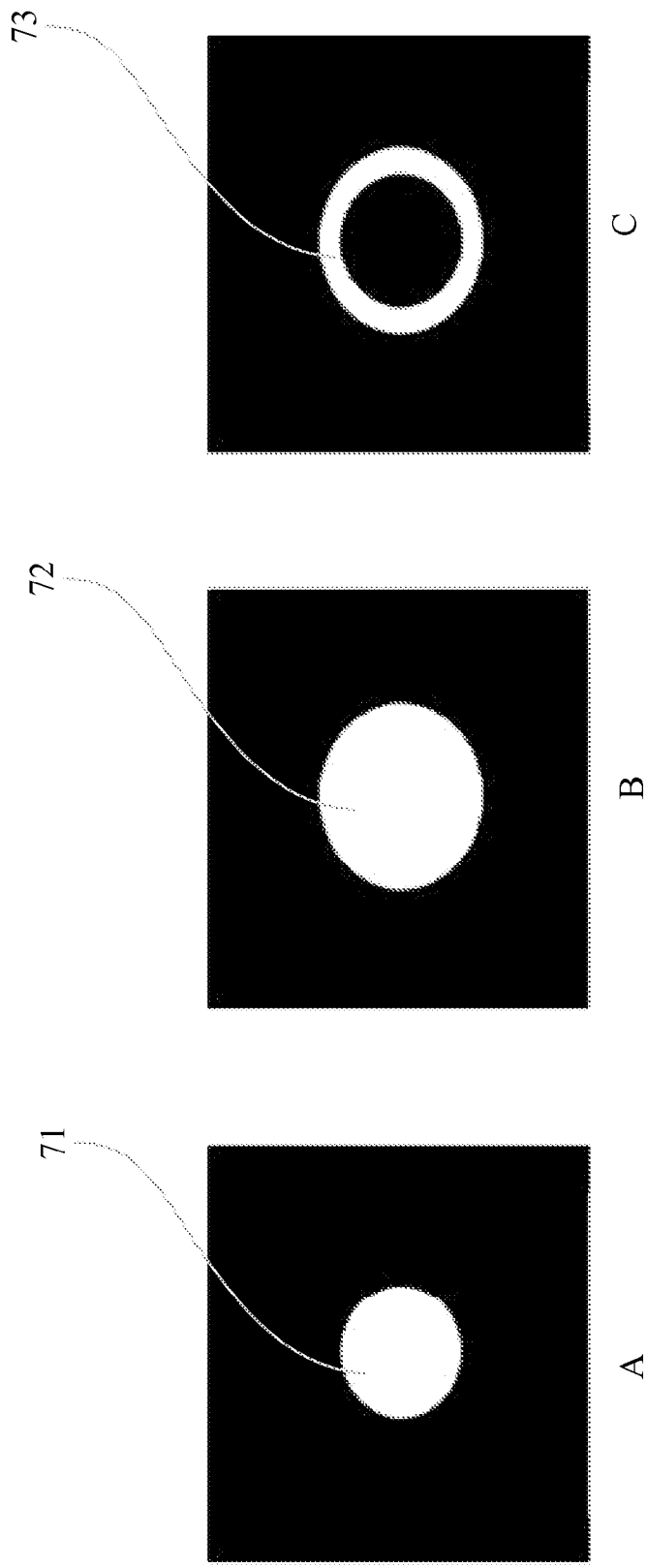
FIGS. 7A-7C show how to extract and determine defect regions.

In the embodiment, the quantified value analysis adopts the Mura defect quantification standard released by the semiconductor equipment and materials international (SEMI) in 2002 which regards a SEMU value as severity order of a Mura defect. As show in formula 10, the SEMU value is a ratio of an average contrast of defect regions and the background regions ($|C_X|$) and a lowest contrast of the Mura defects ($C_{jnd}$). The SEMU value may be obtained by formula 10.

$$\text{Semu} = |C_X|/C_{jnd} \quad (10)$$

$$C_{jnd} = 1.97/S^{0.33} + 0.72 \quad (11)$$

Wherein S denotes the sizes of the defects, which can be easily calculated because the defect regions are segmented; $C_{jnd}$ denotes the lowest contrast of the Mura defects, which is defined as formula 11; $|C_X|$ denotes the average contrast of defect regions and the background regions, which is defined as formula 12.

$$|C_X| = \frac{|I_O - I_B|}{I_B} \times 100\% \quad (12)$$

Wherein $I_O$ denotes the average brightness of the Mura defects, $I_B$ denotes the average brightness of the background region. FIG. 6 is a schematic diagram showing the defects and the background region. In the invention, the inventors take the average brightness $I_B$ of the strip region 62 as the average brightness of the background and take the average brightness $I_O$ of the defect region 62 as the average brightness of the Mura defects. As shown in FIG. 7, the defect region 72 in FIG. 7B is formed by performing a dilation operation on the defect region 71 in FIG. 7A. The strip region 73 in FIG. 7C is formed through performing a subtraction calculation or a XOR logic calculation with the images in FIG. 7A and FIG. 7B.

Each of the SEMU values of the defect regions is calculated according to the segmented defect regions. Thus, the acceptable regions can be eliminated, and the grade of the defects can be judged. A threshold to determine whether a defect is acceptable also can be set. Regions where the SEMU values are lower than the threshold are acceptable regions, and regions where the SEMU values are higher than the threshold are unacceptable defect regions that will be remained as an inspection result. In addition, not limited to judging defects with SEMU values, any other methods of measuring the defects can be applied as the defect inspection method of the invention.

Figure 8:
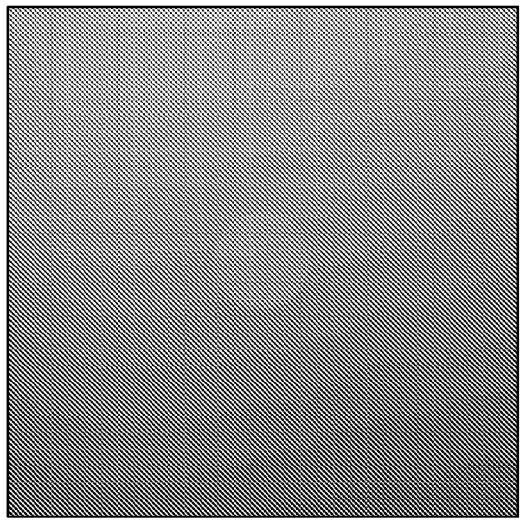
FIGS. 8A-8D show examples to eliminate misjudgment regions.
Figure 8:
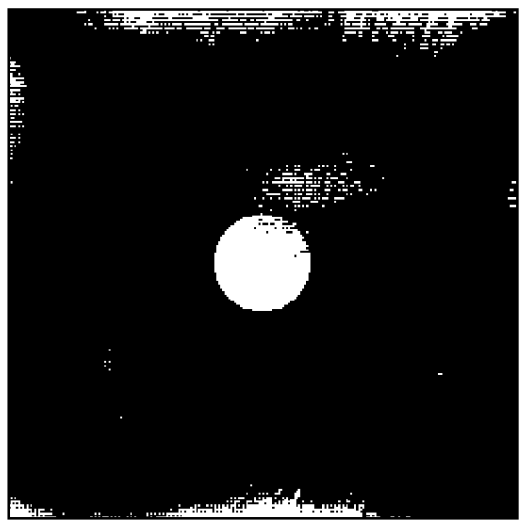
Figure 8:
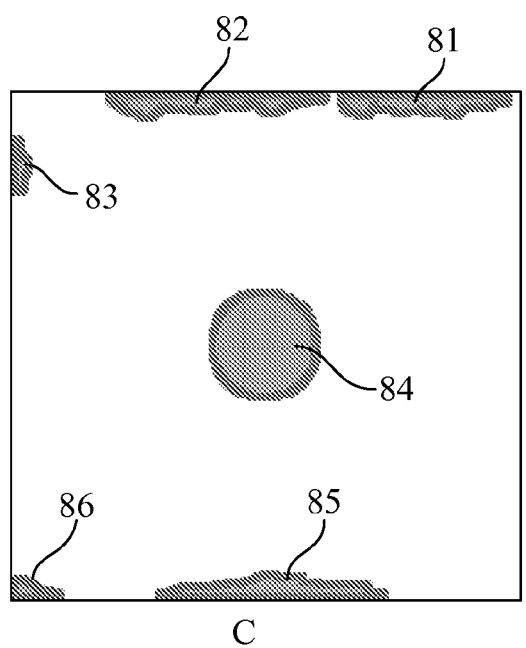
Figure 8:
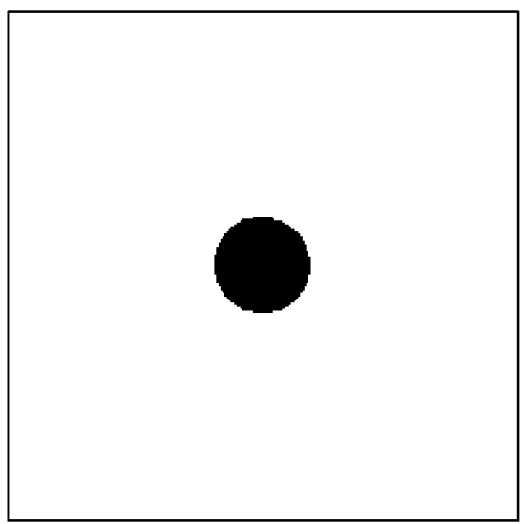

FIG. 8 shows an example of eliminating the acceptable regions. FIG. 8A shows the original image with natural Mura defects. FIG. 8B shows the defect regions after performing a DCT and an image binarization operation on the original image. FIG. 8C shows the defect regions after performing a SEMU quantization operation on the defect regions in FIG. 8B. Table 1 shows the SEMU quantization results of the six defect regions, namely 81 to 86, in FIG. 8C. In this embodiment, the threshold is 1, and the regions whose SEMU values are lower than 1 (region 81, 82,83, 85, 86) are eliminated. The final inspection result is that region 84 is a non-uniform image defect region, as shown in FIG. 8D.

TABLE 1

| serial number | S (pixel) | $I_O$ (gray) | $I_B$ (gray) | $|C_X|$ (%) | $C_{jnd}$ (%) | SEMU |
|---|---|---|---|---|---|---|
| 81 | 221 | 154.92 | 154.27 | 0.42 | 1.05 | 0.40 |
| 82 | 232 | 146.22 | 145.80 | 0.29 | 1.04 | 0.27 |
| 83 | 18 | 139.77 | 140.61 | 0.59 | 1.47 | 0.40 |
| 84 | 1824 | 133.81 | 123.84 | 8.04 | 0.88 | 9.09 |
| 85 | 259 | 87.80 | 88.14 | 0.38 | 1.03 | 0.37 |
| 86 | 19 | 87.94 | 88.69 | 0.83 | 1.46 | 0.57 |

The quantization threshold quantization is regarded as a standard to judge whether a defect exits, and the quantization threshold equals to 1 in this embodiment. The invention can also set the quantization threshold according to other judgment standards.

Embodiment 5—Defect Inspection for a Flat Panel Display

Figure 9:
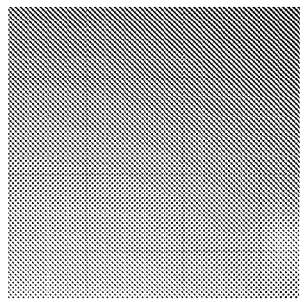
FIGS. 9A-9O show 15 examples of natural Mura defects.
Figure 9:
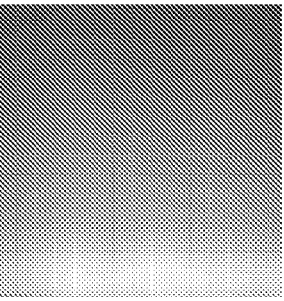
Figure 9:
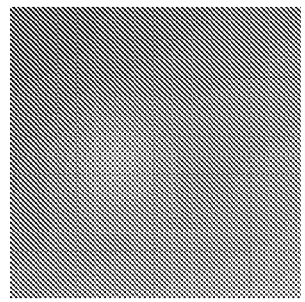
Figure 9:
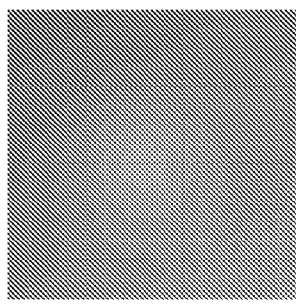
Figure 9:
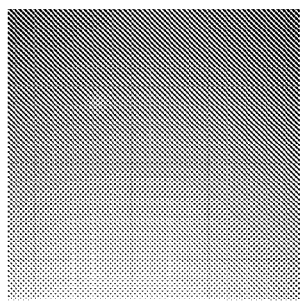
Figure 9:
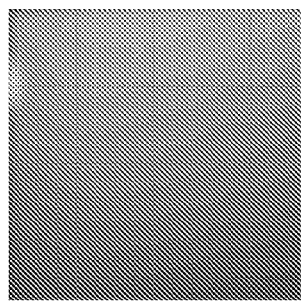
Figure 9:
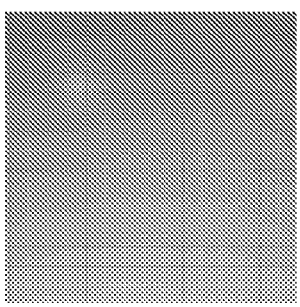
Figure 9:
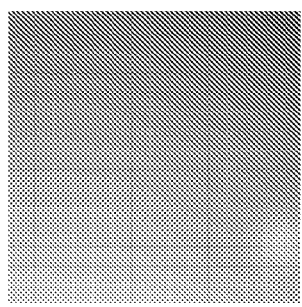
Figure 9:
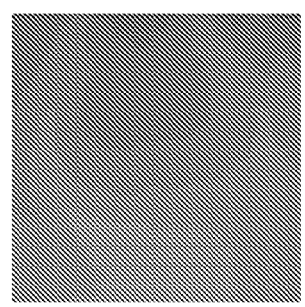
Figure 9:
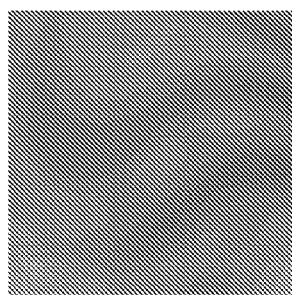
Figure 9:
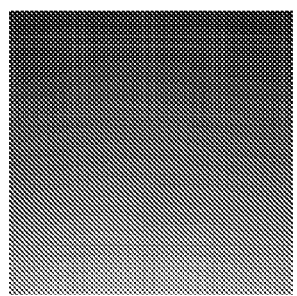
Figure 9:
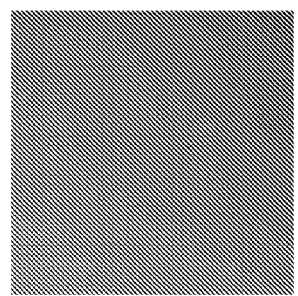
Figure 9:
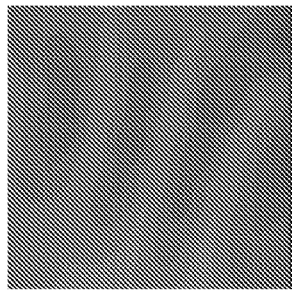
Figure 9:
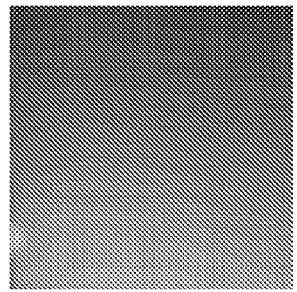
Figure 9:
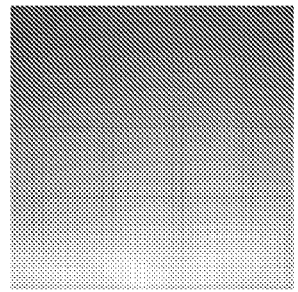
Figure 10:
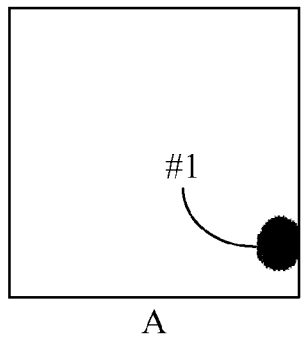
FIGS. 10A-10O show the results from using the image non-uniform inspection.
Figure 10:
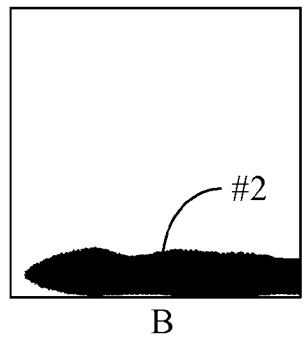
Figure 10:
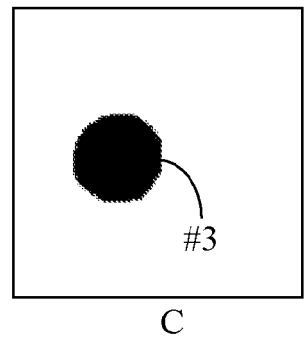
Figure 10:
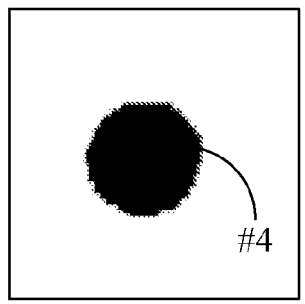
Figure 10:
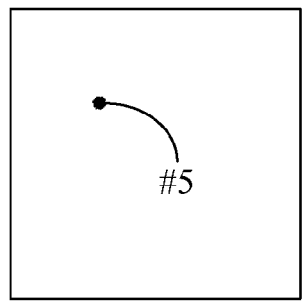
Figure 10:
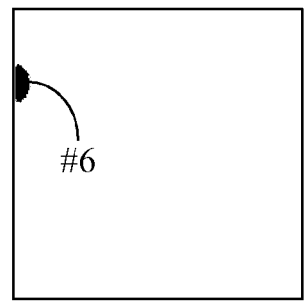
Figure 10:
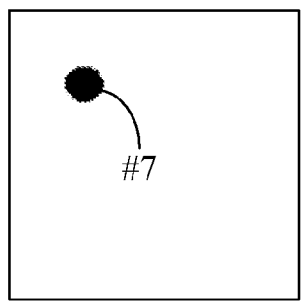
Figure 10:
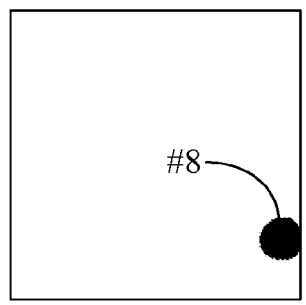
Figure 10:
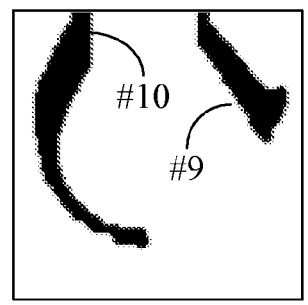
Figure 10:
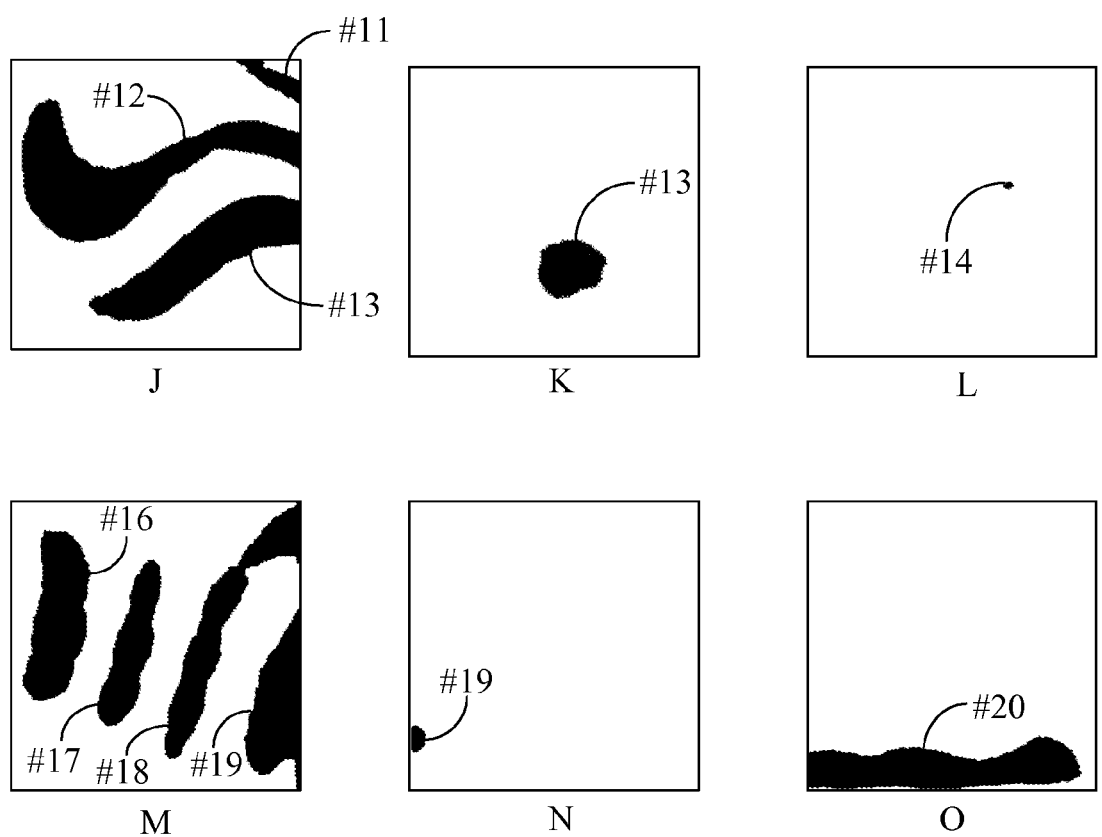

In this embodiment, the non-uniform image defect inspection method is applied to perform Mura defect inspection operation on fifteen flat panel displays. The Mura defect inspection includes the following steps: inputting the images (shown in FIG. 9) of the flat panel displays captured by a CCD camera to a computer; performing a 2D DCT operation on an image to reconstruct a background image; obtaining an optimal threshold by applying a maximum entropy method with the reconstructed background image; performing an image binarization operation with the optimal threshold; processing the binarization image with median filtering, erosion and dilation to eliminate uneven edges of the defect regions, and obtain orbicular defect regions; performing a SEMU quantization operation and determining the grades of the defect regions; eliminating acceptable defect regions whereby the defects are shown in the residual image. The Mura defect inspection results are shown in FIG. 10 and table 2. After compared with the results of eyes inspection, the Mura defect inspection results are proved correct.

TABLE 2

| Figure number | Defect number | $|C_X|$ (%) | $C_{jnd}$ (%) | SEMU | Inspection result |
|---|---|---|---|---|---|
| FIG. 10A | #1 | 6.3 | 0.92 | 6.83 | Correct |
| FIG. 10B | #2 | 13.24 | 0.79 | 16.69 | Correct |
| FIG. 10C | #3 | 7.59 | 0.9 | 8.36 | Correct |
| FIG. 10D | #4 | 7.65 | 0.9 | 8.43 | Correct |
| FIG. 10E | #5 | 7.64 | 1.02 | 7.45 | Correct |
| FIG. 10F | #6 | 10.87 | 1.01 | 10.71 | Correct |
| FIG. 10G | #7 | 7.69 | 0.98 | 7.77 | Correct |
| FIG. 10H | #8 | 6.62 | 0.91 | 7.21 | Correct |
| FIG. 10I | #9 | 1.3 | 0.94 | 1.38 | Correct |
| FIG. 10I | #10 | 3.11 | 0.98 | 3.15 | Correct |
| FIG. 10J | #11 | 3.09 | 0.95 | 3.23 | Correct |
| FIG. 10J | #12 | 5.49 | 0.81 | 6.76 | Correct |
| FIG. 10J | #13 | 7.65 | 0.82 | 9.28 | Correct |
| FIG. 10K | #14 | 1.76 | 0.9 | 1.96 | Correct |
| FIG. 10L | #15 | 5.91 | 1.32 | 4.46 | Correct |
| FIG. 10M | #16 | 5.06 | 0.81 | 6.23 | Correct |
| FIG. 10M | #17 | 4.95 | 0.82 | 5.99 | Correct |
| FIG. 10M | #18 | 1.54 | 0.82 | 1.87 | Correct |
| FIG. 10M | #19 | 2.31 | 0.82 | 2.81 | Correct |
| FIG. 10N | #20 | 11.13 | 1.01 | 10.97 | Correct |
| FIG. 10O | #21 | 7.38 | 0.8 | 9.14 | Correct |

The advantages of the non-uniform image defect inspection method according the invention are described as below.

1. The background image is reconstructed by a DCT operation, and the inspection object is the residual image of subtracting the background image from the original image. Thus, defects segmentation can be performed without image templates and defect inspection can detect defects with different morphological shapes.

2. SEMU value defined by a Mura quantifying formula released by SEMI is utilized to judge the defects, so the misjudgment regions can be eliminated effectively, and the grades of the image defects can be determined.

3. DCT is easier and significantly faster than FFT when used for Mura defect inspection. It only takes less than 200 milliseconds to inspect a 256×256 image when the inspection computer is configured with AMD 2.08G CPU and 212 MB RAM.

The above description is given by way of example, and not limitation. Given the above disclosure body, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-uniform image defect inspection method, comprising steps of:
   a) inputting an original two-dimensional image into a computer;
   b) separating a non-uniform background image from the original two-dimensional image by Discrete Cosine Transform (DCT) performed by the computer to obtain a residual image without the non-uniform background image, wherein step (b) further comprises:

b1) performing a 2-D (two-dimensional) DCT operation on the original two-dimensional image to obtain DCT coefficients of a frequency domain by the computer;
b2) selecting a cut-off frequency from the frequency domain and eliminating high-frequency DCT coefficients higher than the cut-off frequency by the computer;
b3) performing a 2-D Inverse DCT (IDCT) operation to reconstruct a background image with a brightness distribution similar to the brightness distribution of the original two-dimensional image by the computer; and
b4) subtracting the background image from the original two-dimensional image to remove the background with non-uniform brightness distribution and obtaining the residual image by the computer; and
c) performing a binarization segmenting the residual image by the computer to extract defects from the residual image so as to obtain inspection results.

2. The non-uniform image defect inspection method of claim 1, wherein in the step b2), the cut-off frequency is a frequency of the DCT coefficients on finishing a first order attenuation, wherein the DCT coefficients less than the cut-off frequency is remained, and the DCT coefficients higher than the cut-off frequency is eliminated through being set as 0.

3. A non-uniform image defect inspection method, comprising steps of:
a) inputting an original two-dimensional image into a computer;
b) eliminating a non-uniform background image from the original two-dimensional image by a DCT operation performed by the computer to obtain a residual image without the non-uniform background image;
c) performing a binarization segmenting the residual image by the computer to extract the defects from the residual image; and d) performing quantified value analysis on the binarization segmented defect regions and setting a quantifying threshold by the computer, wherein regions with a corresponding quantified value less than the quantifying threshold are regarded as acceptable regions and eliminated, and the residual defect regions are the inspection results.

4. The non-uniform image defect inspection method of claim 3, wherein the step b) further comprise the follows steps:
b1) performing a 2-D DCT operation on the original two-dimensional image to obtain DCT coefficients of a frequency domain by the computer;
b2) selecting a cut-off frequency from the frequency domain and eliminating high-frequency DCT coefficients higher than the cut-off frequency by the computer;
b3) performing a 2-D IDCT operation to reconstruct a background image with a brightness distribution similar to the brightness distribution of the original two-dimensional image by the computer; and
b4) subtracting the background image from the original two-dimensional image to remove the background having non-uniform brightness distribution and obtaining the residual image by the computer.

5. The non-uniform image defect inspection method of claim 4, wherein in the step b2), the cut-off frequency is a frequency of the DCT coefficients on finishing a first order attenuation, wherein the DCT coefficients less than the cut-off frequency is remained, and the DCT coefficients higher then the cut-off frequency is eliminated through being set as 0.

6. The non-uniform image defect inspection method of claim 3, wherein in the step d), the quantified value analysis is a quantified operation on SEMU values, representing Mura defect quantification.

* * * * *